July 2, 1968 T. W. EDDY 3,391,341
RECEIVING SYSTEM FOR SUPPRESSED CARRIER WAVES
Filed Sept. 23, 1965
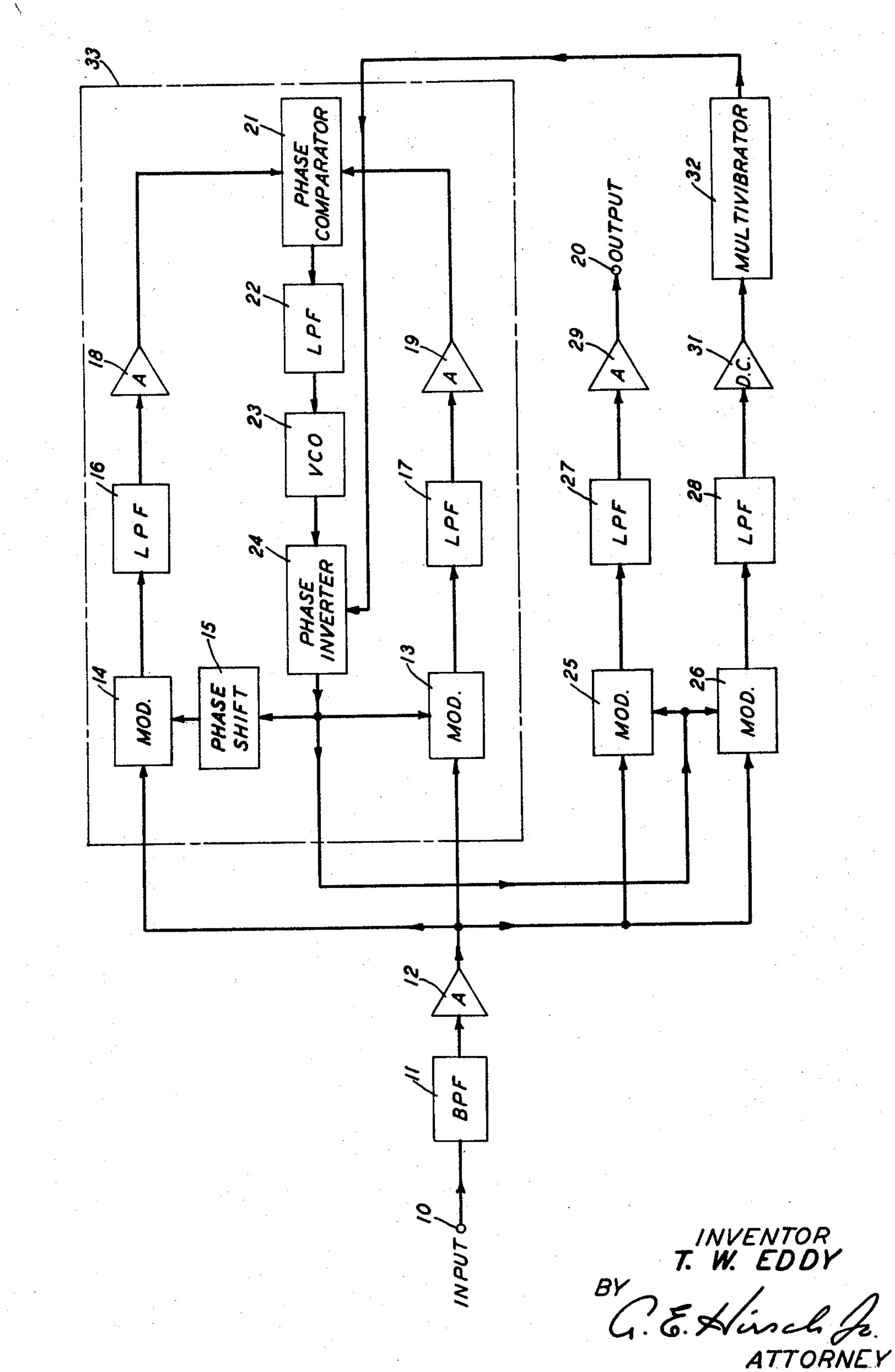
INVENTOR
T. W. EDDY
BY G. E. Hirsch Jr.
ATTORNEY United States Patent Office 3,391,341
Patented July 2, 1968

3,391,341
RECEIVING SYSTEM FOR SUPPRESSED CARRIER WAVES

Thomas W. Eddy, Whippany, N.J., assignor to Bell Telephone Laboratories, Incorporated, New York, N.Y., a corporation of New York Filed Sept. 23, 1965, Ser. No. 489,552
8 Claims. (Cl. 325—329)

This invention pertains to signal receiving systems and, more particularly, to an improved receiving system for amplitude modulated, suppressed carrier signals.

Suppressed (also referred to as reduced, restricted, or partially suppressed) carrier communication systems are of present interest and value because of the substantial reduction in power requirements that may be effected by their use. A major problem involved in the reception and detection of amplitude modulated reduced carrier signals is the reconstruction or reinsertion of a local carrier signal, of the correct phase and frequency, at the receiver.

Envelope detection techniques have been used, in the prior art, to effect a reconstruction of the carrier signal. However, such techniques have several disadvantages. As is well known, a carrier component large in comparison with the sideband components must be transmitted in order to avoid excessive waveform distortion. Besides being wasteful of transmitter power, the consequential low modulation index results in a susceptibility to noise and signal contamination.

As a consequence, resort has been made to synchronous detection which permits a reduction in the magnitude of the carrier component transmitted. More of the available transmitter power may appear in the information bearing sideband components with a concomitant reduction in noise susceptibility. However, an increased burden is placed upon the receiver's ability to reconstruct accurately a local carrier reinsertion signal of the same frequency and phase as the received suppressed carrier signal. Conventional systems which heterodyne the received suppressed carrier signal with a locally generated signal use a phase-lock loop to establish a correspondence in frequency between the received and locally generated signals. Systems of this sort are impractical in numerous situations; the suppressed carrier must be of a significant magnitude in order for it to be detected. In addition, where the received signal has sideband components which extend into the vicinity of the transmitted carrier, random fluctuations in frequency and phase of the received carrier result from interaction with these components. In other systems where the received sideband information is utilized to develop the reconstructed carrier signal, via phase comparator means, the phase ambiguity problem arises. The reconstructed carrier signal has an inherent 180 degree phase ambiguity, i.e., the received carrier signal may be in phase or 180 degrees out of phase with the locally generated reinsertion carrier signal. Absence of phase similarity results in a reversal of the polarity of the detected output signal with an accompanying reduction in the information bearing qualities of the signal. For example, in data communication systems using bipolar binary digital signals, reversal of the polarity of the detected signals has, as is readily apparent, catastrophic results.

It is, therefore, an object of this invention to effect reception of amplitude modulated, suppressed carrier signals free of the limitations inherent in the techniques of the prior art.

Another object of the present invention is to detect amplitude modulated signals having a carrier component of substantially reduced magnitude.

Still another object of the present invention is to detect accurately amplitude modulated, suppressed carrier signals when the sideband components of said signals extend into the vicinity of the carrier component.

Yet another object of this invention is to detect amplitude modulated, suppressed carrier signals absent the phase ambiguity inherent in systems of the prior art.

These and other objects are accomplished, in accordance with the present invention, by selectively altering the phase of the reconstructed carrier signal to establish a non-ambiguous phase correspondence between the received suppressed carrier and the reconstructed carrier. More particularly, the received sideband components are utilized to develop a frequency control signal for the local carrier source. An auxiliary modulator responsive both to the received carrier component and to the reconstructed carrier signals develops a signal, the polarity of which is indicative of the phase relationship of the two carrier signals. Control means, sensitive to the polarity of the developed signal, effect the desired phase inversion if a dissimilarity in phase exists. The resultant reconstructed carrier signal, identical in phase and frequency to the received carrier signal and absent any phase ambiguity, is used to demodulate the received signal thereby developing the desired information bearing components.

These and further features and objects of this invention, its nature and various advantages, will be more readily apparent upon consideration of the attached drawing and of the following detailed description of the drawing.

The receiving system of the present invention, depicted in block form in the drawing, is responsive to amplitude modulated partially suppressed carrier signals applied to the designated input terminal 10. Illustratively, the modulated signal may be of the double sideband variety. Input terminal 10 symbolically represents any conventional means for receiving and conveying information bearing message waves. For example, it may be the termination of juxtaposed antenna and intermediate frequency heterodyning apparatus. In another application of this invention, input terminal 10 may be the termination of a multiplex transmission link.

The applied signals are conveyed to a bandpass filter 11 in order to eliminate extraneous and undesired signals. Filter 11 may also be used, in an appropriate system, as a frequency selective device for discriminating amongst a plurality of multiplexed signal channels. Responsive to the output signals of bandpass filter 11 is a conventional amplifier 12 utilized to compensate for losses and fading in the transmission link. After amplification, the received information wave is applied to modulators 13 and 14 of synchronous detector 33. Since it is well recognized that the use of the terms "modulator" and "demodulator" primarly relates to the viewpoint of the observer, the following text will be simplified by consistently referring to such apparatus by the generic designation "modulator." Modulators 13 and 14 heterodyne the applied amplitude modulated signal with two signals which are derived from voltage controlled oscillator 23. In modulator 13 the applied modulated signal is directly heterodyned with the output of oscillator 23 to develop what is commonly referred to as the in-phase component of the modulated signal. The operation and function of phase inverter 24 will be discussed hereafter. In modulator 14 the applied modulated signal is heterodyned with the oscillator output signal, altered in phase $\pi/2$ radians by phase shift network 15, to develop what is commonly known as the quadrature component of the modulated signal. The output signal of modulator 13 has a signal component which is proportional in magnitude to cos $\theta$ where $\theta$ is the phase error of the signal of oscillator 23 with respect to the received reduced carrier signal. All but this component of the demodulated signal are eliminated by low pass filter 17. Similarly, a component of the demodulated signal appearing at the output of modulator 14 is proportional in magnitude to sin $\theta$. Other undesired components are eliminated by low pass filter 16. The demodulated signal components appearing at the output of filters 16 and 17, respectively, are the original baseband signals of the received message wave proportional in amplitude to a trigonometric function of $\theta$, the phase difference between the locally generated carrier signal of oscillator 23 and the received suppressed carrier signal. The output signals of filters 16 and 17 are applied, respectively, to amplifiers 18 and 19 in order to provide a proper operating level for phase comparator 21.

At this juncture of the system's operation, all vestiges of the received carrier signal have been eliminated. It should be noted that the control information, utilized to tune oscillator 23, is derived entirely from the sideband components of the received signal; the received carrier is not used in any way for this purpose.

Phase comparator 21, which may be of any type known to those skilled in the art, is responsive to the output signals of amplifiers 18 and 19 and develops a signal proportional to the product of these two applied signals. The output signal of phase comparator 21 is thus proportional to cos $\theta$ multiplied by sin $\theta$ which, by a well-known trigonometric identity, is proportional to sin $2\theta$. Substantially the A.C. components appearing at the output of phase comparator 21 are rejected by low pass filter 22. Thus a control signal proportional in magnitude to the sine of $2\theta$ is applied to oscillator 23. If for any reason the respective frequencies of the received restricted carrier signal and the signal output of oscillator 23 should drift apart, the magnitude of the control signal will adjust accordingly, such that the local oscillator frequency will be identical to the frequency of the received partially suppressed carrier signal.

The reconstructed carrier signal appearing at the output of oscillator 23 is also applied to modulator 25 (by way of inverter 24) wherein it is heterodyned with the received modulated wave from amplifier 12. The output of modulator 25 is applied to low pass filter 27 which removes all components but the desired modulating baseband signal. This baseband signal is increased in magnitude by amplifier 29 and appears at terminal 20 as the desired demodulated output signal.

As previously mentioned, the control signal applied to oscillator 23 is proportional to the sine of $2\theta$. Since sin $2(180°+\theta)=\sin 2\theta$, the frequency control loop of synchronous detector 33 cannot distinguish between $\theta$ and $(180°+\theta)$. Thus, since the reconstructed carrier signal has an inherent 180° phase ambiguity, the received signal may be in phase or 180° out of phase with the reinserted carrier signal. Absence of phase similarity results in a reversal of the polarity of the output signal, appearing at terminal 20, with a concomitant reduction in the information bearing qualities of the signal. Thus, in accordance with the practice of the present invention, means are utilized for detecting and correcting the error inherent in the operation of synchronous detector 33. An auxiliary modulator 26 responsive to the applied message wave and reconstructed carrier signal, appearing at the output of oscillator 23, develops a signal proportional to the cosine of $\theta$ substantially identical to that developed by modulator 13, as discussed above. Low pass filter 28 eliminates all signal components except the D.C. component whose magnitude is proportional to cos $\theta$. Since the cosine of $(\theta+180°)$ is equal to $-\cos\theta$, the polarity of the signal appearing at the output of filter 28 is indicative of the phase relationship of the received carrier wave and the reconstructed carrier signal. This D.C. component is amplified by D.C. amplifier 31 and applied to multivibrator circuit 32 of any well-known type. If the output of D.C. amplifier 31 is positive, phase correspondence exists and multivibrator 32 is not enabled. However, if the output of amplifier 31 has a polarity which is negative, indicative of 180° phase reversal, multivibrator 32 is activated and operates phase inverter 24. In its simplest form, phase inverter 24 may be a mechanical switch utilized to interchange the output conductors of oscillator 23, thus to compensate for the phase reversal of the reconstructed carrier signal. In a preferred form, phase inverter 24 may be a transistor switching circuit of any well-known type.

Thus, in accordance with the practice of the present invention, a control signal is developed which is utilized to alter the phase of the reinserted carrier signal appearing at the output of oscillator 23 to establish a nonambiguous phase correspondence between the received carrier wave and the locally generated oscillator signal.

It is to be understood that the embodiments shown and described are illustrative of the principles of the invention only, and that further modifications of this invention may be employed by those skilled in the art without departing from the scope and spirit of the invention. For example, the principles of this invention may find use in vestigial sideband transmission systems.

What is claimed is:

1. A signal receiving system comprising, in combination, means responsive to the sideband information of applied amplitude modulated, suppressed carrier signals for developing a carrier reinsertion signal of a frequency corresponding to that of said suppressed carrier, means responsive to said modulated signals and said carrier reinsertion signal for developing a signal corresponding to the modulating information, means responsive to said modulated signals and said carrier reinsertion signal for developing a control signal indicative of the phase relationship of said suppressed carrier and said carrier reinsertion signals, and means responsive to said control signal for selectively altering the phase of said carrier reinsertion signal.

2. A receiving system as defined in claim 1 wherein said means for developing said control signal comprises:

means for heterodyning said applied modulated signals and said carrier reinsertion signal to develop a signal having a component whose polarity is indicative of the phase relationship of said suppressed carrier and said carrier reinsertion signals, means for selectively transmitting said signal component, and multivibrator means responsive to the polarity of said signal component for developing said control signal.

3. A receiving system as defined in claim 1 wherein said means for selectively altering the phase of said carrier reinsertion signal comprises phase inverter means.

4. A system for receiving amplitude modulated, reduced carrier signals comprising:

synchronous detection means responsive to the sideband information of said received signals for developing a reconstructed carrier signal of a frequency corresponding to that of said received reduced carrier signal, first modulation means responsive to said received signals and said reconstructed carrier signal for developing a signal representative of the received information, second modulation means responsive to said received signals and said reconstructed carrier signal for developing a control signal indicative of the phase relationship of said reduced carrier and said reconstructed carrier signals, and means responsive to said control signal for selectively altering the phase of said reconstructed carrier signal to establish a nonambiguous phase correspondence between said reduced carrier and said reconstructed carrier signals.

5. A system as defined in claim 4 wherein said synchronous detection means comprises:

a source of signals of variable frequency, first modulation means responsive to said source of signals and said received signals for developing a first signal proportional to the cosinusoidal function of the phase difference between said signals, means for altering the phase of the signals of said source, second modulation means responsive to said altered signals of said source and said received signals for developing a second signal proportional to the sinusoidal function of the phase difference between said signals, phase comparator means responsive to said first and said second signals for developing an error control signal, and means for applying said error control signal to said source of signals to effect a correspondence in frequency between the signals of said source and said received reduced carrier signal.

6. A system as defined in claim 4 wherein said means for developing said control signal comprises:

means for heterodyning said received signals and said reconstructed carrier signal to develop a signal having a component whose polarity is indicative of the phase relationship of said reduced carrier and said reconstructed carrier signals, means for selectively transmitting said signal component, and multivibrator means responsive to the polarity of said signal component for developing said control signal.

7. A signal detection system comprising:

a source of amplitude modulated, partially suppressed carrier signals, detection means responsive to said modulated carrier signals for developing a demodulating signal of a frequency corresponding to that of said suppressed carrier, modulation means responsive to said modulated carrier signals and said demodulating signal for developing a baseband output signal, means for heterodyning said modulated carrier signals and said demodulating signal to develop a signal having a component whose polarity is indicative of the phase relationship of said suppressed carrier and said demodulating signals, means for selectively transmitting said component, multivibrator means responsive to the polarity of said component for developing a control signal, and phase inverter means responsive to said control signal for selectively altering the phase of said demodulating signal.

8. A receiving system as defined in claim 7 wherein said detection means comprises:

a source of signals, first modulation means responsive to said source of signals and said amplitude modulated signals for developing a first signal proportional to the cosinusoidal function of the phase difference between said signals, means for altering the phase of the signals of said source, second modulation means responsive to said altered signals of said source and said amplitude modulated signals for developing a second signal proportional to the sinusoidal function of the phase difference between said signals, phase comparator means responsive to said first and said second signals for developing an error control signal, and means for applying said error control signal to said source of signals to effect a correspondence in frequency between the signals of said source and said applied suppressed carrier.

References Cited

UNITED STATES PATENTS

| | | | |
|---|---|---|---|
| 2,784,311 | 3/1957 | Kahn | 325—329 |
| 2,924,706 | 2/1960 | Sassler | 325—329 |

KATHLEEN H. CLAFFY, *Primary Examiner.*

R. S. BELL, *Assistant Examiner.*